United States Patent [19]
Barey

[11] Patent Number: 5,866,190
[45] Date of Patent: Feb. 2, 1999

[54] COMPOSITION FOR THE STABILIZATION OF ACID DRINKS

[75] Inventor: Philippe Barey, Saint Martin le Greard, France

[73] Assignee: Systems Bio-Industries, Boulogne, France

[21] Appl. No.: 621,378

[22] Filed: Mar. 14, 1996

Related U.S. Application Data

[63] Continuation-in-part of Ser. No. 557,208, Nov. 14, 1995, abandoned.

[30] Foreign Application Priority Data

Mar. 16, 1995 [FR] France ................................... 95 03066

[51] Int. Cl.⁶ ............................... A23L 1/05; A23L 1/06
[52] U.S. Cl. ............................ 426/573; 426/575; 426/577
[58] Field of Search .................................... 426/573, 575, 426/577

[56] References Cited

U.S. PATENT DOCUMENTS

| | | | |
|---|---|---|---|
| 4,276,311 | 6/1981 | Burrows et al. | 426/577 |
| 4,504,504 | 3/1985 | Gaehring et al. | 426/321 |
| 5,356,654 | 10/1994 | Speirs et al. | 426/575 |
| 5,385,748 | 1/1995 | Bunger et al. | 426/590 |
| 5,498,702 | 3/1996 | Mitchell et al. | 536/2 |
| 5,529,796 | 6/1996 | Gobbo et al. | 426/330.3 |
| 5,576,039 | 11/1996 | Lewis | 426/250 |

FOREIGN PATENT DOCUMENTS

| | | |
|---|---|---|
| 0 639 335 | 2/1995 | European Pat. Off. . |
| 35 01 305 | 7/1986 | Germany . |
| 57-208965 | 12/1982 | Japan . |
| 58-013358 | 1/1983 | Japan . |
| 62-228227 | 10/1987 | Japan . |
| 62-248464 | 10/1987 | Japan . |
| 83-21572K | 9/1983 | United Kingdom . |

OTHER PUBLICATIONS

Food Chemistry, by Owen R. Fennema, pp. 214–216, 1996.

*Primary Examiner*—Peter Chin
*Assistant Examiner*—Jacqueline A. Ruller
*Attorney, Agent, or Firm*—Jacobson, Price, Holman & Stern, PLLC

[57] ABSTRACT

The subject of the invention is a composition for stabilizing a non-milk drink, in particular a drink based on fruits and/or vegetables, comprising insoluble components, the said composition comprising a combination of a pectin and of an alginate in which the ratio of the amount of methylated galacturonic acid (MGA) units of the pectin to the amount of guluronic acid (G) units of the alginate is between 0.30 and 0.70.

The invention also relates to a process for the preparation of such a stabilized drink.

13 Claims, No Drawings

COMPOSITION FOR THE STABILIZATION OF ACID DRINKS

This is a Continuation-In-Part of application Ser. No. 08/557,208, filed Nov. 14, 1995, now abandoned the disclosure of which is incorporated herein by reference.

The invention relates to a composition for stabilizing a non-milk drink, in particular a drink based on fruits and/or vegetables, comprising insoluble components and to a process for the preparation of such a stabilized drink.

The problem encountered with drinks comprising insoluble components, such as pulps, essential oils, and the like, is the tendency of the insoluble components to separate (sedimentation or creaming).

In order to solve this problem and to keep the insoluble components in suspension, it has been proposed in the case of fruity drinks of "squash" type (having a very high content of solid components) to raise the viscosity of the drink by addition of components such as, for example, pectin, gums or alginates (S. Ranganna and B. Raghuramaiah, Indian Food Packer, March, April 1970, p. 14–21).

Moreover, K. Toft et al. have described, in the context of a study carried out on low-sugar jam, the synergic effect on formation of heat-reversible gels of mixtures of alginates and of pectins with a high content of methoxy groups (American Chemical Society, 1986, p. 10 et seq.; and K. Toft, Prog. Fd. Nutr. Sci., vol. 6, pp. 89–96, 1982).

It has now been discovered that the combination of alginate and of pectin made it possible to obtain drinks comprising insoluble components having an excellent stability with time and of very low viscosity.

"Stability" within the meaning of the present invention is understood to mean the maintenance of the insoluble components in suspension and the homogeneity of the suspension initially formed.

The drinks containing insoluble components are, in accordance with the present invention, any drink of non-milk origin, still or carbonated, sweetened or unsweetened, salted or unsalted, containing or not containing alcohol, to be consumed as it is or which can be diluted.

These drinks generally have a solids content of between 1 and 70% by weight, a pH of between 2.5 and 4, an alcohol content of between 0 and 45% by volume and a salt (NaCl) content of between 0 and 3% by weight.

Pectin is a partially methylated polyanhydrogalacturonic acid linear macromolecule, represented schematically by the following formula:

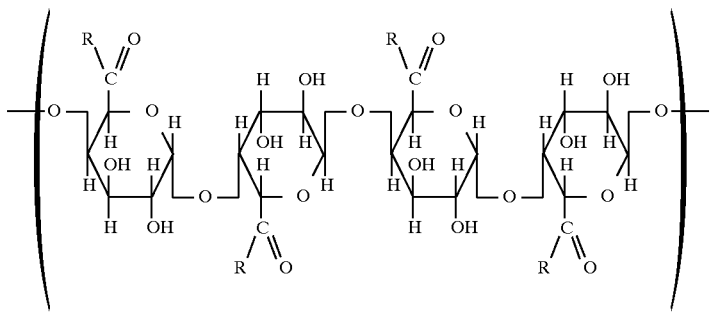

in which R=OH and OCH$_3$ (pectins) and OH, OCH$_3$ and NH$_2$ (amidated pectins).

The degree of esterification of a pectin is variable and between 25 and 50% for a lightly methylated (LM) pectin and greater than 50% for a highly methylated (HM) pectin.

The degree of amidation is most often less than 25%, this level constituting the upper limit allowed for pectins intended for foodstuffs.

Alginates are natural polysaccharides, the basic units of which are formed by partially salified β-1,4-D-mannuronic acid and α-1,4-L-guluronic acid, as represented below.

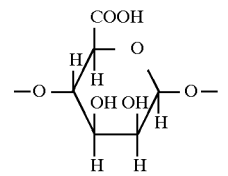

β-1, 4-D-mannuronate

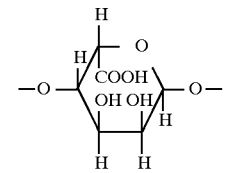

α-1, 4-L-guluronate

The subject of the invention is the use of a combination of alginate and of pectin for stabilizing a non-milk drink, in particular based on fruits and/or vegetables, comprising suspended insoluble components.

It was observed that a synergic effect on the ability to form a three-dimensional network of very low viscosity but sufficiently resistant to maintain the insoluble components in suspension was obtained when the ratio of the amount of methylated galacturonic acid (MGA) units of the pectin to the amount of guluronic acid (G) units of the alginate was between 0.30 and 0.70, in particular 0.40 and 0.60.

The specific compositions having this ratio are novel and constitute another subject of the invention.

All alginates can be employed; however, alginates having an amount of mannuronic acid units/amount of guluronic acid units ratio of less than 1 are preferred.

The alginate is advantageously a sodium alginate.

All HM and LM pectins (amidated or non-amidated) can be employed; however, pectins with a high degree of esterification (HM pectins) are preferred.

According to a first aspect of the invention, the composition described above is in the powder form and substantially free of free calcium ions and optionally comprises a complexing agent for calcium.

According to a second aspect of the invention, the composition described above is in the form of an aqueous solution, is substantially free of free calcium ions and optionally comprises a complexing agent for calcium.

An additional subject of the invention is a process for the preparation of a non-milk drink, in particular based on fruits and/or vegetables, comprising insoluble components, characterized in that a solution prepared beforehand by dissolving pectin and alginate, preferably sodium alginate, in aqueous medium, substantially in the absence of free calcium ions, is added to the said drink and the said medium is acidified to a pH of less than 4.

The total amount of alginate and of pectin added is advantageously between 0.01% and 0.2% by dry weight with respect to the total weight of the drink finally obtained, an optimum ratio with pectins with a high degree of esterification and alginates which are rich in guluronic acids being approximately 0.04% by dry weight with respect to the weight of the final drink.

According to the invention, it is essential that, during the preparation of the final drink, the pectin/alginate mixture is dissolved in aqueous medium in the absence of free $Ca^{++}$ ions or at least in the presence of amounts of free $Ca^{++}$ ions not exceeding trace amounts.

When the aqueous medium contains free $Ca^{++}$ ions, a complexing agent for calcium in acid medium which is compatible with a food composition, for example sodium polymetaphosphate, may be added either to the alginate/pectin solution or to the fruit-based drink before the addition of the alginate/pectin mixture or to both. It is also possible to add a complexing agent for free calcium to the aqueous phase, containing neither fruit juice nor acid, before the addition of the pectin/alginate mixture, such as, for example, alginate, preferably sodium alginate, or lightly methylated pectin. Low-viscosity sodium alginate will be preferred, because it will modify the rheology of the medium only to a very small extent.

The presence of the complexing agent for calcium is generally depending on the manufacturer of the drink. Once the drink is stabilized, it is immaterial whether calcium ions are subsequently added. Thus, for example, when the final drink is a concentrated drink intended to be diluted before consumption, it is immaterial if the latter is diluted with a hard water (rich in calcium).

It is also important to acidify the medium after dissolution of the alginate/pectin mixture, preferably to a pH of between 2.5 and 4, an optimum pH being 3.1.

A study carried out in a synthetic medium (that is to say free of pulps) demonstrating the influence of the MGA/G ratio, of the concentration of alginate/pectin mixture and of the pH on the final viscosity and/or the stability of the solutions will be described below.

The starting materials used in the context of this study are as follows:

Tap water: 30° TH

Pectin : Unipectine RS 150° SAG, marketed by Systems Bio-Industries (SBI): MGA=59%

Alginate : Satialgine SG 300 (SBI): M/G=0.5

Calcium complexing agent: sodium polymetaphosphate (Merck)

The compositions studied comprise the following constituents:

| 1) | Distilled water | 10.00% |
|---|---|---|
| | Pectin/alginate mixture | 0.05% |
| 2) | Tap water | q.s. for 100% |

| | | |
|---|---|---|
| | Sodium polymetaphosphate | 0.10% |
| | Citric acid | 0.30% |
| | Sucrose | 10.60% |

Their process of preparation comprises the following stages:

1) the mixture of hydrocolloids (pectin/alginate mixture) is dispersed in distilled water at 80° C. and stirring is maintained for 10 minutes, 2) the sodium polymetaphosphate, the citric acid and the sugar are dispersed in tap water (20° C.) and the preparation is heated to 65° C., 3) 1) is added to 2), 4) the mixture is heated to 90° C. and is maintained at this temperature for 5 minutes, 5) the mixture is cooled to room temperature without stirring.

The final characteristics of the solutions obtained are:

pH=3.1

Solids content (%)=11 a) Influence of the MGA/G Ratio on the Final Viscosity:

(Viscosity measurement: Brookfield LVT, 30 r/min, UL rotor)

pH=3.1

Quantitative determination of the pectin/alginate mixture=0.05%

Viscosity of the control (hydrocolloid-free synthetic medium)=1.2 mPa·s

| MGA/G Ratio | 0.22 | 0.28 | 0.36 | 0.44 | 0.54 | 0.66 | 0.81 | 1.07 | 1.55 |
|---|---|---|---|---|---|---|---|---|---|
| Viscosity in mPa·s | 4.10 | 4.00 | 5.70 | 5.70 | 5.60 | 5.40 | 4.90 | 4.30 | 2.50 | b) Influence of the MGA/G Ratio on the Stability

Quantitative determination of the pectin/alginate mixture=0.05% pH=3.1

Duration of the observation=50 days.

| MGA/G Ratio | 0.22 | 0.29 | 0.36 | 0.44 | 0.54 | 0.66 | 0.81 | 1.07 | 1.55 |
|---|---|---|---|---|---|---|---|---|---|
| Stability | 0% | 0% | 50% | 100% | 100% | 50% | 0% | 0% | 0% | c) Influence of the Quantitative Determination of the Pecton/Alginate Mixture

MGA/G ratio used=0.6 pH=3.1

Viscosity measured at low shear 30 (speed 35 $sec^{-1}$)

| Quantitative determination in % | 0.080 | 0.075 | 0.07 | 0.065 | 0.06 | 0.05 | 0.04 |
|---|---|---|---|---|---|---|---|
| Viscosity | 11.27 | 9.81 | 9 | 8.08 | 7.49 | 5.3 | 1.52 |
| Solution appearance | gelled | gelled | gelled | specks of gel | fluid + gel specks | liquid fluid | liquid fluid |
| Stability 50 d. | 100% | 100% | 100% | 100% | 100% | 100% | 0% | d) Influence of the pH

MGA/G ratio=0.6

Quantitative determination of the pectin/alginate mixture=0.05%

Viscosity measured at low shear 30

| pH | 2.8 | 2.9 | 3 | 3.1 | 3.2 | 3.3 | 3.4 |
|---|---|---|---|---|---|---|---|
| Viscosity | 3.8 | 4.4 | 5 | 5.2 | 4.9 | 4.3 | 3.7 |
| Stability 50 d. | 0% | 0% | 100% | 100% | 0% | 0% | 0% |

The present invention is illustrated below by implementational examples of drinks obtained from the compositions according to the invention.

EXAMPLE 1

Still Drinks Containing Orange Pulp.

The compositions and the stability of still drinks containing orange pulp obtained with different concentrations of pectin and of alginate are shown in the table below.

Their process of preparation is as follows:

1) the Pectin/Alginate mixture is dispersed in distilled water at 80° C. and is maintained at this temperature with stirring for 10 minutes,
2) the sodium polymetaphosphate, the sugar, the flavour and the acid are added with stirring to the tap water,
3) 2) is pasteurized at 90° C.,
4) 1) is added to 2) during pasteurization (maintenance at 90° C. for 5 minutes),
5) the final mixture is packaged.

| Unipectine RS+ | 0.11 g | 0.15 g | 0.17 g | 0.20 g |
|---|---|---|---|---|
| Satialgine SG 300 | 0.33 g | 0.29 g | 0.27 g | 0.24 g |
| Distilled water | 100 g | 100 g | 100 g | 100 g |
| Tap water | q.s. for 1000 g | q.s. for 1000 g | q.s. for 1000 g | q.s. for 1000 g |
| Orange flavour | 30.00 g | 30.00 g | 30.00 g | 30.00 g |
| SPMP* | 1.00 g | 1.00 g | 1.00 g | 1.00 g |
| Sucrose | 90.00 g | 90.00 g | 90.00 g | 90.00 g |
| Citric acid | 3.40 g | 3.40 g | 3.40 g | 3.40 g |
| MGA/G Ratio | 0.3 | 0.45 | 0.55 | 0.7 |
| Stability 50 d. | Settling | 100% stable | 100% stable | Settling |

+Unipectine RS : Unipectine RS 150° SAG
*SPMP : Sodium polymetaphosphate
Δ orange flavour : flavour LC 20062 marketed by SBI The drinks in which the MGA/G ratio is between 0.40 and 0.60 are 100% stable after storing for 50 days at room temperature. Those in which the ratio is 0.30 or 0.70 exhibit settling after storing for 50 days, whereas a control drink (same non-stabilized formula) exhibits very marked settling of the pulp after 24 hours.

Example of a Drink Obtained with Another Grade of Pectin

The same type of drink is obtained with another grade of pectin which is Unipectine 3450 NA 95, in which the MGA content is 14.7%.

The process of preparation is identical to that described for the preceding drinks.

| Composition | | |
|---|---|---|
| a | Unipectine 3450 NA 95 | 0.55 g |
|   | Satialgine SG 300 | 0.25 g |
|   | Distilled water | 100.00 g |
| b | Orange flavour | 30.00 g |
|   | Sodium polymetaphosphate | 1.00 g |
|   | Sucrose | 90.00 g |
|   | Citric acid | 3.40 g |
|   | Tap water (30°TH) | q.s. for 1000.00 g |

The final characteristics of the drink obtained are:

pH=3.1

Solids content (%)=11.4

Viscosity (low shear 30)=4.8 mPa·s

The drink is 100% stable after storage for 50 days.

Example of a Drink Obtained with a Sodium Alginate as Complexing Agent for Calcium

| a | Unipectine RS | 0.17 g |
|---|---|---|
|   | Satialgine SG 300 | 0.27 g |
|   | Satialgine S 20* | 1.50 g |
| b | Orange flavour | 30.00 g |
|   | Sucrose | 90.00 g |
|   | Citric acid | 3.40 g |
|   | Tap water (30°TH) | q.s. for 1000.00 g |

*Satialgine S 20 : sodium alginate : M/G = 1.2

The process for the preparation of this type of drink comprises the following stages:

1) a premix of Satialgine S 20 with a portion (⅕) of the sugar is prepared and the mixture is then dispersed in cold water with stirring until dissolution is complete,
2) a premix of Satialgine SG 300 and Unipectine RS with a portion (⅕) of the sugar is prepared and the mixture is dispersed in cold water (where Satialgine S 20 is already dissolved) with stirring until dissolution is complete,
3) the remaining sugar is added,
4) an optional heat treatment is carried out on the preparation at this stage,
5) the concentrated fruit juice and the citric acid are added,
6) the drink is packaged in bottles.

The final characteristics of the solution obtained are:

pH=3.1

Solids content (%)=11

The drink is 100% stable after storage for 100 days.

EXAMPLE 2
"Light" Still Drink Containing Orange Pulp.

|   | Formula: |   |
|---|---|---|
| a | Unipectine RS[(1)] | 0.17 g |
|   | Satialgine SG 300[(2)] | 0.27 g |
|   | Deionized water | 100 g |
| b | Tap water | q.s. for 1000 g |
|   | Orange flavour[(3)] | 30.00 g |
|   | Sodium polymetaphosphate | 1.00 g |
|   | Citric acid | 3.40 g |
|   | Aspartame 200 | 0.115 g |
|   | Acesulfame-K | 0.115 g |

[(1)]Pectin with an MGA content = 59%, 150° SAG, marketed by SBI (Systems Bio Industries).
[(2)]Sodium alginate: M/G = 0.5, marketed by SBI.
[(3)]Flavour marketed by SBI, pH = 3.3; Brix = 63°; Amount of pulp = 4% (w/w)

The final drink was prepared in the same way as in Example 1, except that the sucrose was replaced by Aspartame 200 and Acesulfame-K.
Characteristics of the Final Drink:
pH=3.1
Solids content (%)=2.3
Viscosity=(low shear 30)=4.6 mPa·s
The drink is 100% stable after 50 days.

EXAMPLE 3
Carbonated Drink Containing Orange Pulp.

|   | Formula: |   |
|---|---|---|
| a | Unipectine RS[(1)] | 0.20 g |
|   | Satialgine SG 300[(2)] | 0.30 g |
|   | Deionized water | 100.00 g |
| b | Carbonated water[(4)] | q.s. for 1000 g |
|   | Orange flavour[(3)] | 30.00 g |
|   | Sodium polymetaphosphate | 1.00 g |
|   | Citric acid | 20.00 g |
|   | Sucrose | 90.00 g |

[(4)]Carbonated mineral water (St. Yorre):
Calcium content : 0.078 g/l
Bicarbonate content : 4.263 g/l Solution a:
The pectin and the alginate are dispersed in deionized water at 80° C. and stirring is carried out for 10 minutes and then cooling is carried out to room temperature.
Solution b:
The sucrose, the flavour and the polymetaphosphate are dispersed in carbonated water at 20° C.
The addition is carried out of a) to b) while cold, the citric acid is then added and the final drink is packaged.
Characteristics of the Final Drink:
pH=3.1
Solids content (%)=12.8
The drink is 100% stable.

EXAMPLE 4
Alcoholic Drink Containing Orange Pulp (20% Volume).

|   | Formula: |   |
|---|---|---|
| a | Unipectine RS[(1)] | 0.20 g |
|   | Satialgine SG 300[(2)] | 0.30 g |
|   | Deionized water | 100.00 g |
| b | Carbonated water[(4)] | q.s. for 1000 g |
|   | Orange flavour[(3)] | 30.00 g |
|   | Sodium polymetaphosphate | 1.00 g |
|   | Citric acid | 3.40 g |
|   | Sucrose | 90.00 g |
|   | 90% Alcohol (ethanol volume) | 22.20 g |

Solution a:
The pectin and the alginate are dispersed in distilled water at 80° C. with stirring and this temperature is maintained for 10 min, and then cooling is carried out to room temperature.
Solution b:
The polymetaphosphate, the orange flavour, the sugar and the alcohol are dispersed in cold water and stirring is carried out until dissolution is complete.
The addition is carried out of a) to b) with stirring, citric acid is then added and the final drink is packaged.
Characteristics of the Final Drink:
pH=3.1
Solids content (%)=11.3
Alcohol=20% volume
The drink is 100% stable after 50 days.

EXAMPLE 5
Concentrated Drink (60% Solids Content) to be Diluted (Squash Type).

|   | Formula: |   |
|---|---|---|
| a | Unipectine RS[(1)] | 0.10 g |
|   | Satialgine SG 300[(2)] | 0.12 g |
|   | Deionized water | 100.00 g |
| b | Tap water (30°TH) | q.s. for 1000 g |
|   | Orange flavour | 160.00 g |
|   | Sodium polymetaphosphate | 1.00 g |
|   | Citric acid | 7.50 g |
|   | Sucrose | 490.00 g |
|   | 90% alcohol (ethanol volume) | 22.20 g |

Solution a:
The pectin and the alginate are dispersed in the distilled water at 80° C., the mixture is maintained for 10 minutes at this temperature and cooling is then carried out to room temperature.
Solution b:
The polymetaphosphate, the orange flavour and the sugar are dispersed in cold water and stirring is carried out until dissolution is complete.
The addition is carried out of a) to b) with stirring, the citric acid is then added and the final drink is packaged.
Characteristics of the Final Drink:
pH=2.9
Solids content (%)=60
The drink is 100% stable after 50 days.

EXAMPLE 6
Salted Drink Based on Vegetable Juice.

|   | Formula: |   |
|---|---|---|
| a | Unipectine RS[(1)] | 0.17 g |
|   | Satialgine SG 300[(2)] | 0.27 g |
|   | Deionized water | 100.00 g |

-continued

| | Formula: | |
|---|---|---|
| b | Tap water | q.s. for 1000 g |
| | Tomato double concentrate (28%) | 360.00 g |
| | Sodium polymetaphosphate | 1.00 g |
| | Citric acid | 15.00 g |
| | Sodium chloride | 6.00 g |

Solution a:

The pectin and the alginate are dispersed in the deionized water at 80° C., the mixture is maintained at this temperature for 10 minutes and cooling is then carried out to room temperature.

Solution b:

The polymetaphosphate and the tomato concentrate are dispersed in cold water and stirring is carried out until dissolution is complete.

The addition is carried out of a) to b) with stirring, the citric acid and the sodium chloride are then added and the final drink is packaged.

Characteristics of the Final Drink:

pH=3.2

Solids content (%)=13

The drink is 100% stable after 50 days.

I claim:

1. Composition for stabilizing a non-milk drink that contains insoluble components, said composition comprising a combination of a pectin and of a naturally occurring alginate in which the ratio of the amount of methylated galacturonic acid (MGA) units of the pectin to the amount of guluronic acid (G) units of the alginate is between 0.30 and 0.70.

2. Composition according to claim 1, wherein the MGA/G ratio is between 0.40 and 0.60.

3. Composition according to claim 1 in the powder form, the said composition being substantially free of free calcium ions.

4. Composition according to claim 1, wherein it is in the form of an aqueous solution which is substantially free of free calcium ions.

5. Composition according to claim 1, in which the naturally occurring alginate is a sodium alginate.

6. Composition according to claim 1, wherein it comprises a complexing agent for calcium.

7. Composition according to claim 6, wherein the complexing agent for calcium is a naturally occurring alginate.

8. Use of a mixture of a naturally occurring alginate and of pectin for the stabilization of a non-milk drink that contains suspended insoluble components, wherein the ratio of the amount of methylated galacturonic acid (MGA) of the pectin to the amount of guluronic acid (G) units of the naturally occurring alginate is between 0.30 and 0.70.

9. Process for the preparation of a non-milk drink that contains insoluble components, wherein a solution prepared beforehand by dissolving pectin and a naturally occurring alginate in aqueous medium, substantially in the absence of free calcium ions, in which the ratio of the amount of methylated galacturonic acid (MGA) of the pectin to the amount of guluronic acid (G) of the naturally occurring alginate is between 0.30 and 0.70, is added to said drink and in that said medium is acidified to a pH of less than 4.

10. Process according to claim 9, wherein the total amount of naturally occurring alginate and of pectin added to the drink is between 0.01% and 0.2% by dry weight with respect to the total weight of the final drink.

11. Composition according to claim 7, wherein the naturally occurring alginate is sodium alginate.

12. Use according to claim 8, wherein the naturally occurring alginate is sodium alginate.

13. Process according to claim 9, wherein the naturally occurring alginate is sodium alginate.

* * * * *